(12) United States Patent
Adkins

(10) Patent No.: US 7,246,446 B2
(45) Date of Patent: Jul. 24, 2007

(54) ADJUSTABLE GUIDE RAIL FOR HAND TOOLS

(75) Inventor: Edward Adkins, Rockford, IL (US)

(73) Assignee: Nomis, LLC, Hempshire, IL (US)

( * ) Notice: Subject to any disclaimer, the term of this patent is extended or adjusted under 35 U.S.C. 154(b) by 0 days.

(21) Appl. No.: 11/108,023

(22) Filed: Apr. 15, 2005

(65) Prior Publication Data
US 2006/0005404 A1 Jan. 12, 2006

Related U.S. Application Data

(60) Provisional application No. 60/562,648, filed on Apr. 15, 2004.

(51) Int. Cl.
*B43L 13/02* (2006.01)
(52) U.S. Cl. .............................. 33/42; 33/447; 30/373; 30/374
(58) Field of Classification Search ................ 33/42, 33/430, 433, 447; 30/372–377
See application file for complete search history.

(56) References Cited

U.S. PATENT DOCUMENTS

| 1,355,724 | A | * | 10/1920 | Zhukoff | 33/811 |
| 1,362,635 | A | * | 12/1920 | Muller | 33/447 |
| 1,410,491 | A | * | 3/1922 | Matoba | 33/338 |
| 1,720,987 | A | * | 7/1929 | Adam | 33/410 |
| 1,934,952 | A | * | 11/1933 | Shoemaker | 33/430 |
| 2,051,741 | A | * | 8/1936 | Parker, Jr. | 33/471 |
| 2,321,692 | A | * | 6/1943 | McPhee | 33/40 |
| 2,713,723 | A | * | 7/1955 | Anderson | 33/435 |
| 3,667,126 | A | * | 6/1972 | Wackerfuss | 33/438 |
| 4,016,649 | A | | 4/1977 | Kloster | |
| 4,127,377 | A | * | 11/1978 | Schlau et al. | 425/385 |
| 4,628,608 | A | | 12/1986 | Kuhlmann et al. | |
| 5,483,751 | A | * | 1/1996 | Kodato | 33/811 |
| 6,141,882 | A | * | 11/2000 | Syken | 33/471 |
| 6,889,440 | B2 | * | 5/2005 | Okada | 33/27.031 |

OTHER PUBLICATIONS

International Preliminary Report on Patentability, International Application No. PCT/US2005/012862, date of issuance of report Jan. 9, 2007, The International Bureau of WIPO.

* cited by examiner

*Primary Examiner*—Yaritza Guadalupe-McCall
*Assistant Examiner*—Tania Courson
(74) *Attorney, Agent, or Firm*—Reinhart Boerner Van Deuren P.C.

(57) ABSTRACT

A method and apparatus are provided for constructing and operating an adjustable guide rail for hand tools, by attaching an elongated blade to a guide with a locking ratcheting apparatus. The locking ratcheting apparatus is thumb-operable. The elongated blade includes a first series of teeth. The guide includes the moveable thumb-operable latch. The latch has a second series of teeth which are selectively moveable into and out of engagement with the first series of teeth on the elongated blade for selectively preventing and allowing sliding movement of the elongated blade with respect to the guide. The teeth allow incremental adjustment of the guide rail apparatus.

14 Claims, 7 Drawing Sheets

FIG. 7    FIG. 8    FIG. 9
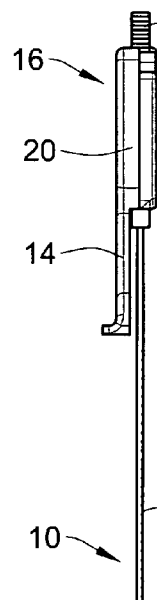
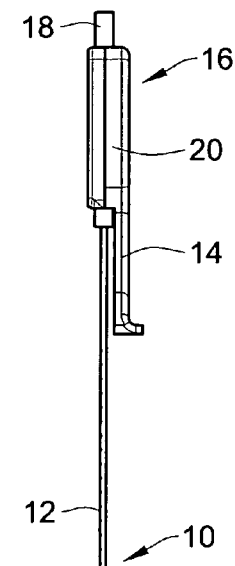
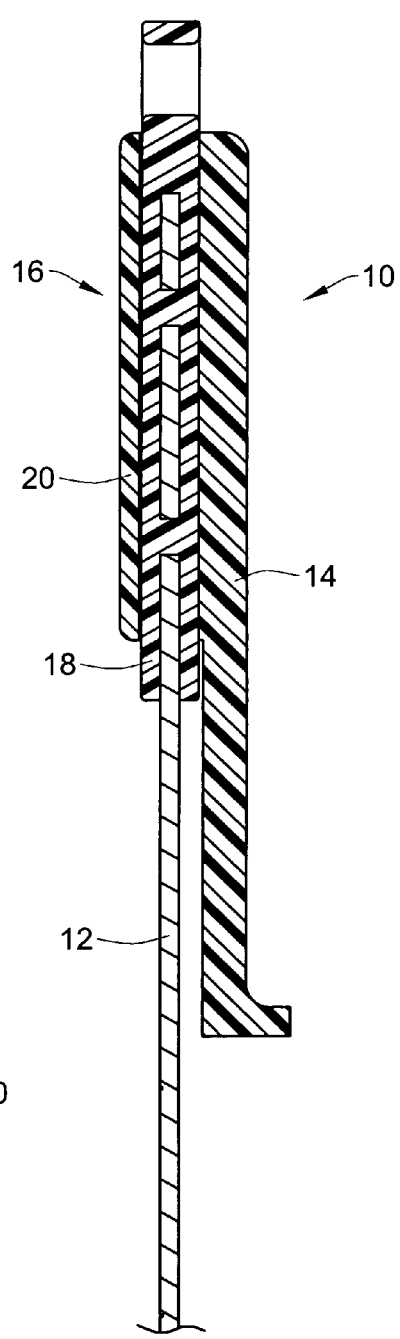
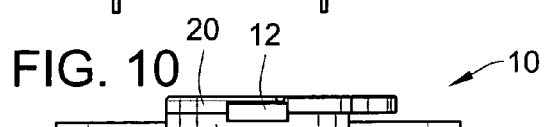
FIG. 10
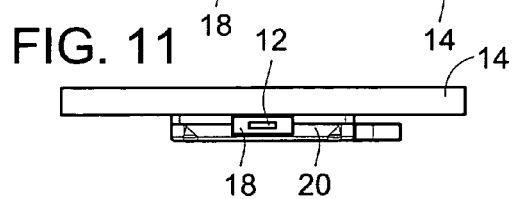
FIG. 11

ADJUSTABLE GUIDE RAIL FOR HAND TOOLS

CROSS-REFERENCE TO RELATED PATENT APPLICATIONS

This patent application claims the benefit of U.S. Provisional Patent Application No. 60/562,648 filed Jul. 06, 2004, the disclosure of which is incorporated herein in its entirety by reference.

FIELD OF THE INVENTION

This invention relates to hand tools, and more particularly to an adjustable guide rail for hand tools.

BACKGROUND OF THE INVENTION

The operation of many hand tools, such as circular saws, jig saws, or routers, and the like, is facilitated for some tasks through the attachment of an adjustable guide rail to the housing of the and tool, for guiding the hand tool in a path that is parallel to an edge of a work piece. In general, such adjustable guide rails for hand tools include an elongated blade which is inserted into a slot in the housing of hand tool and locked in place. A guide portion of the adjustable guide rail, having a slot therein for receipt of the elongated blade, is then moved along the elongated blade to place an edge guide portion of the guide in proper position to abut the edge of a work piece to be cut or worked by the hand tool.

In general, the guide portion of prior adjustable guide rails for hand tools is locked to the elongated blade of the adjustable guide rail by a screw, which must be loosened in order to move the guide along the elongated blade. In order to lock the screw securely enough in place to prevent movement of the guide along the elongated blade, during operation of the hand tool, it is often necessary to tighten the screw with a screwdriver, an allen wrench, or other appropriate tool. The necessity for using such tools to make adjustments to the guide rail is undesirable. Adjustment arrangements utilized in prior adjustable guide rails also typically do not provide a means for readily incrementally adjusting the position of the guide along the elongated blade.

What is needed, therefore, is an improved apparatus and method for providing guidance of a hand tool with respect to the edge of a work piece.

BRIEF SUMMARY OF THE INVENTION

The invention provides an improved method and apparatus for constructing and operating an adjustable guide rail for hand tools, by attaching an elongated blade to a guide with a locking ratcheting apparatus. The locking ratcheting apparatus may be thumb-operable.

In one form of the invention, an adjustable guide rail apparatus includes an elongated blade having a first series of teeth, and a guide including a moveable thumb-operable latch having a second series of teeth which are selectively moveable by the thumb-operable latch into and out of engagement with the first series of teeth on the elongated blade, for selectively preventing and allowing sliding movement of the elongated blade with respect to the guide. The teeth allow for incremental adjustment of the position of the guide along the elongated blade.

A thumb-operable latch, in an adjustable guide rail apparatus according to the invention, may include a spring for urging the second series of teeth on the thumb-operable latch into engagement with the first series of teeth on the blade. The latch may be biased by the spring to urge the second series of teeth on the latch into engagement with the first series of teeth on the elongated blade, when the thumb-operable latch is in a normally non-actuated position whereat thumb-pressure is not being exerted on the latch.

A locking ratcheting apparatus, according to the invention, may include a slider and a cover operatively attached to the elongated blade and guide respectively of an adjustable guide rail apparatus according to the invention. The slider may be fixedly attached to the elongated blade and define the first series of teeth. The guide and cover, in combination, may define a slot for sliding receipt therein of the slider. The cover may include a portion thereof forming the moveable thumb-operable latch. The portion of the cover forming the moveable thumb-operable latch may also form the spring. The guide may include a guide surface thereof. The guide surface of the guide may be oriented perpendicularly to the slot.

The invention may also take the form of a method for operating an adjustable guide rail for hand tools, with the method including operatively connecting an elongated blade to a guide of the adjustable guide rail with a locking ratcheting apparatus. Where the locking ratcheting apparatus is thumb-operable, a method, according to the invention, may include adjusting the relative position of the guide on the elongated blade while applying thumb-pressure to the thumb-operable locking apparatus. Where the elongated blade includes a first series of teeth, and the guide includes a moveable thumb-operable latch having a second series of teeth which are selectively moveable by the thumb-operable latch into and out of engagement with the first series of teeth on the elongated blade, the method may include selectively moving the second series of teeth into and out of engagement with the first series of teeth, for selectively preventing and allowing sliding movement of the elongated blade with respect to the guide.

A method, according to the invention, may further comprise spring biasing the thumb-operable latch to urge the second series of teeth on the thumb-operable latch into engagement with the first series of teeth on the blade. A method, according to the invention, may further include spring biasing the second series of teeth on the latch into engagement with the first series of teeth on the elongated blade when the thumb-operable latch is in a normally non-actuated position whereat thumb-pressure is not being exerted on the latch.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

1-4, illustrating the manner in which a thumb actuated latch, according to the invention, is actuated for making adjustments in the position of the guide rail.

Figure 3:
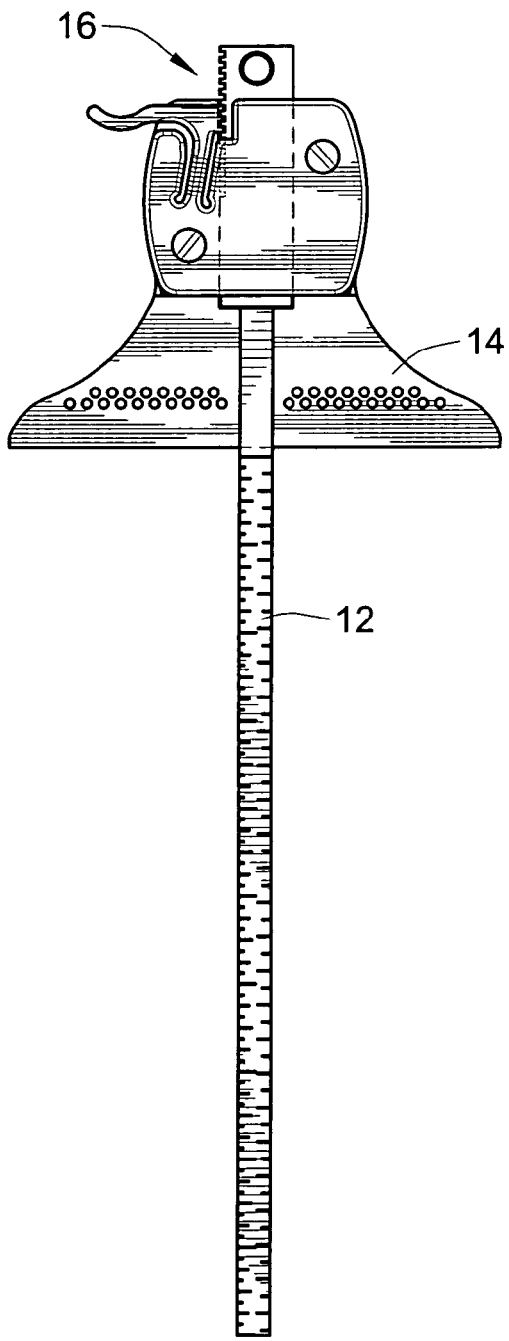

FIG. 7 is a left side view of the adjustable guide rail of the exemplary embodiment shown in FIG. 3.

FIG. 8 is a right side view of the exemplary embodiment of the adjustable guide rail shown in FIG. 3.

Figure 5:
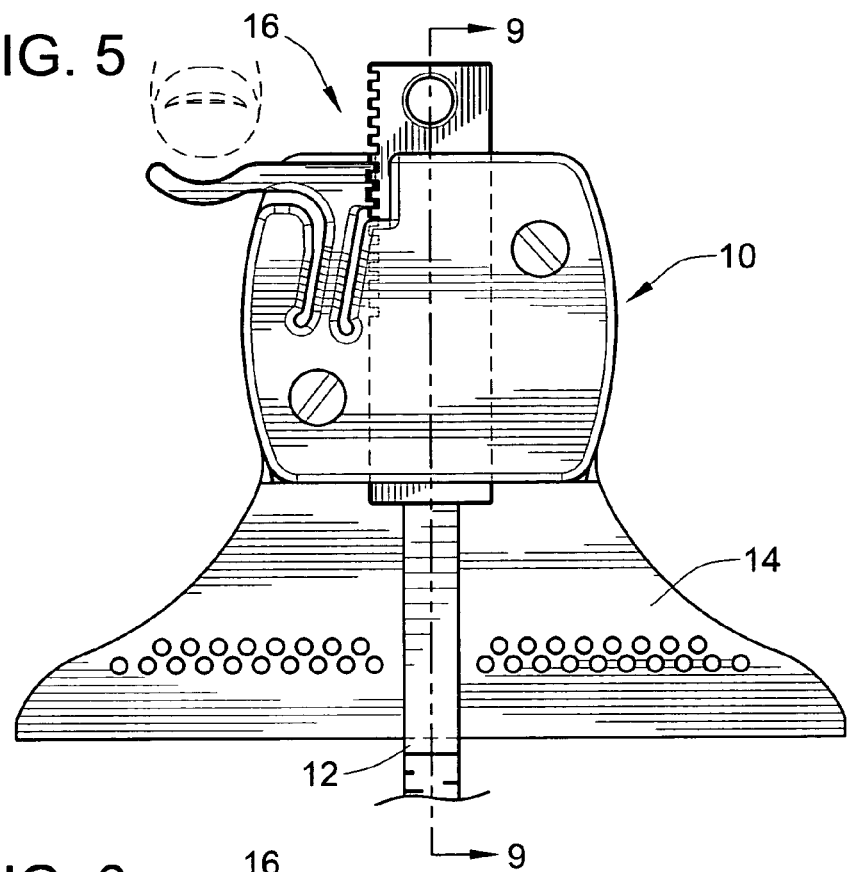
FIGS. 5 and 6 are partial orthographic views of the exemplary embodiment of the guide rail shown in FIGS.

FIG. 9 is an enlarged cross-sectional view of a portion of the exemplary embodiment of the adjustable guide rail shown in FIG. 3, taken along line 9—9 as shown in FIG. 5.

Figure 1:
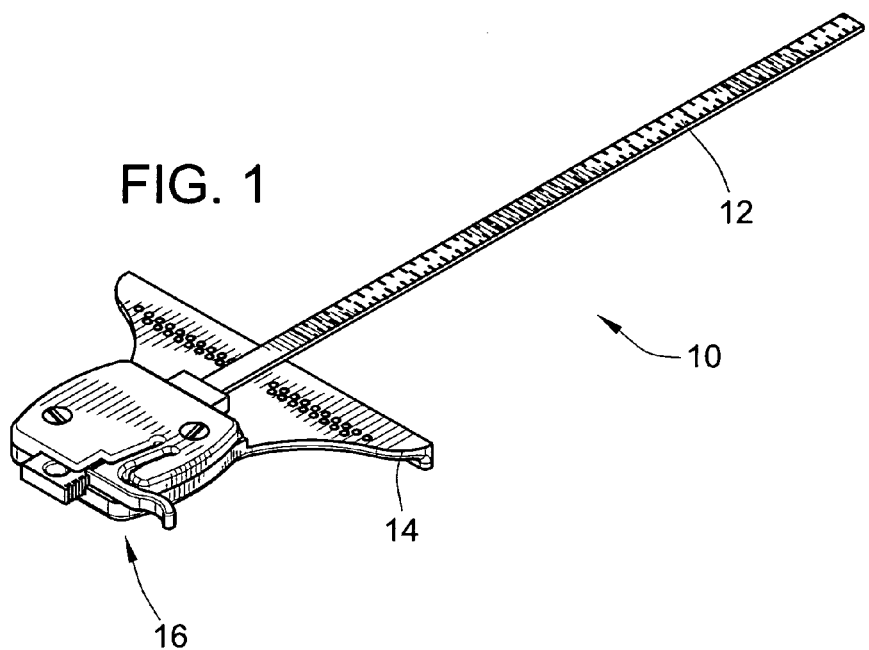
FIGS. 1 and 2 are perspective top and bottom views, respectively, of an exemplary embodiment of an adjustable guide rail for circular saws and jigsaws, according to the invention.
Figure 2:
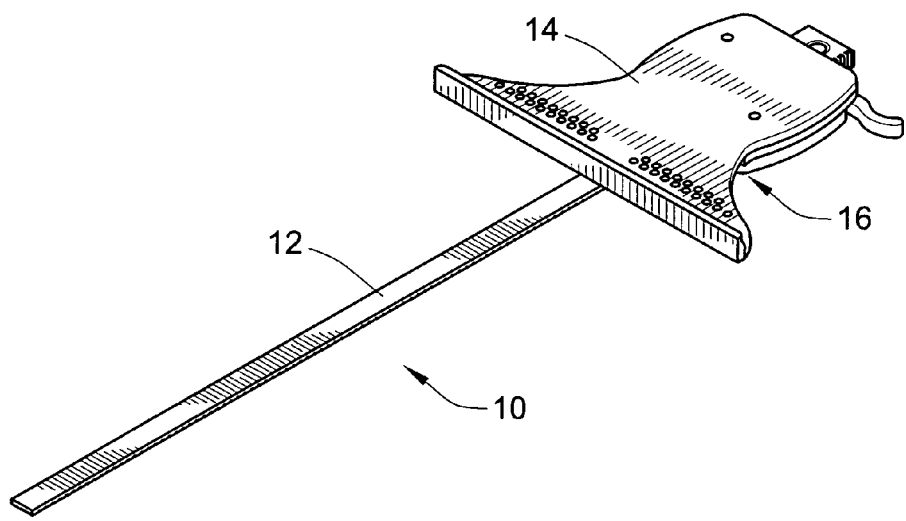
Figure 4:
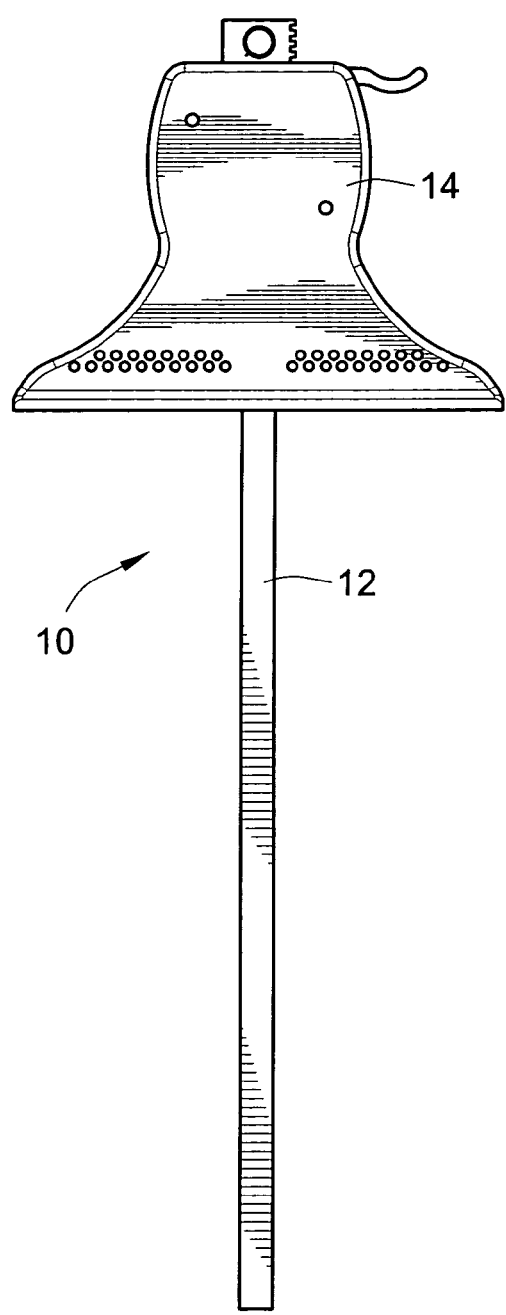
FIGS. 3 and 4, respectively, are orthographic top and bottom views of the adjustable guide rail for circular saws and jigsaws of FIGS. 1 and 2.

FIG. 10 is a top view of the exemplary embodiment of the adjustable guide rail shown in FIG. 4.

FIG. 11 is a bottom view of the exemplary embodiment of the adjustable guide rail shown in FIG. 4.

Figure 12:
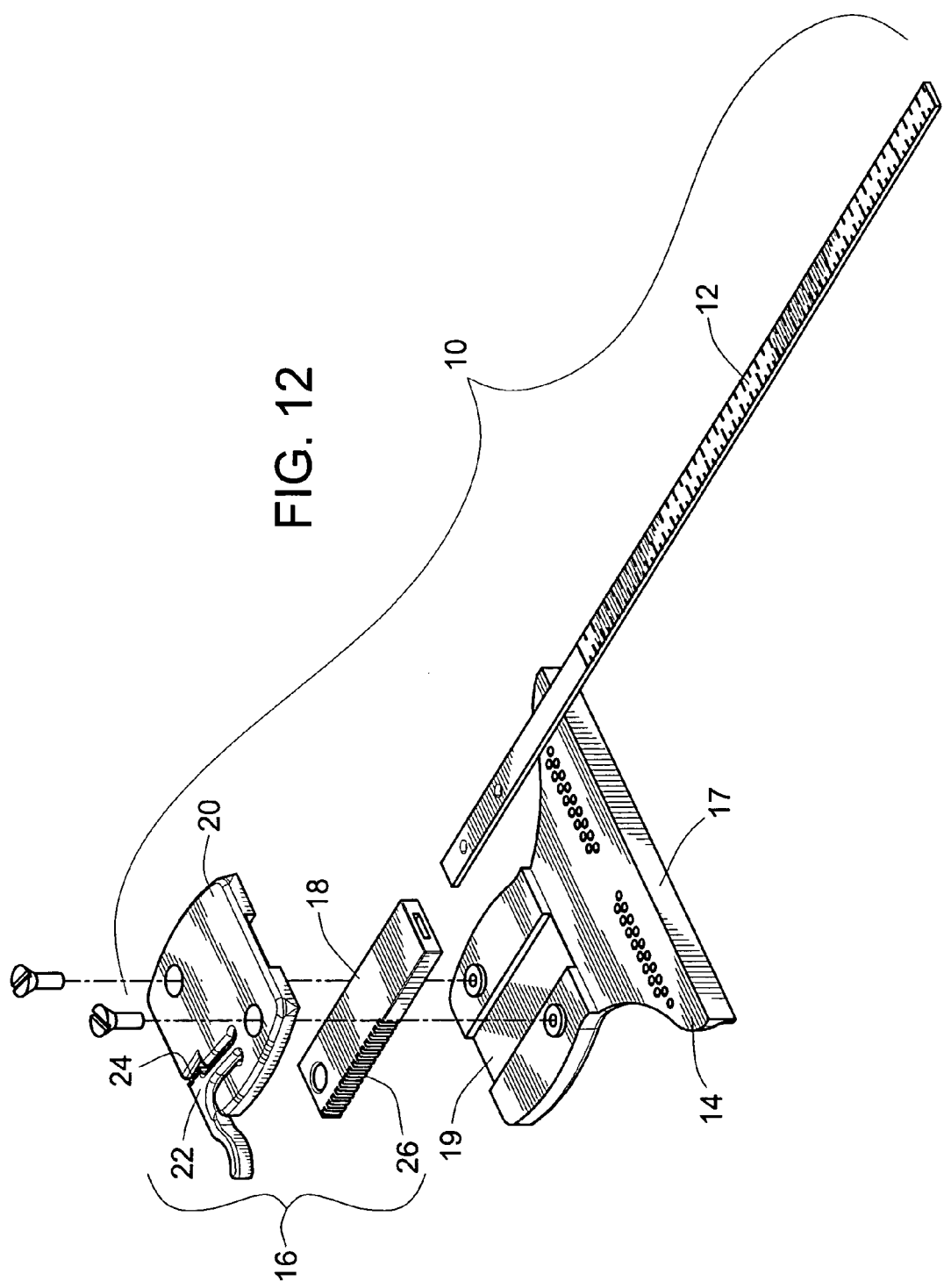

FIG. 12 is an exploded perspective view of the exemplary embodiment of the adjustable guide rail shown in FIGS. 1-11.

Figure 13:
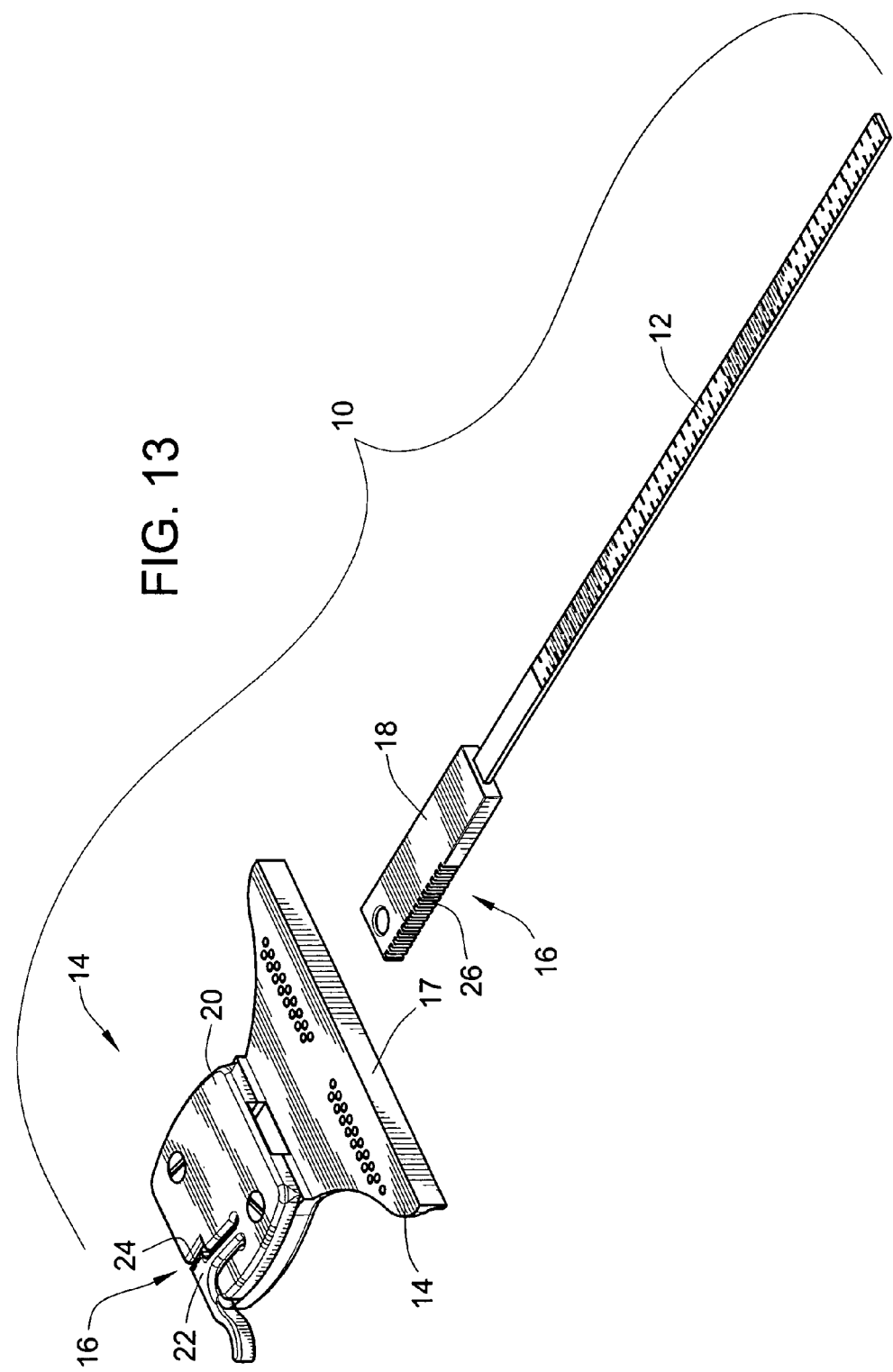

FIG. 13 is a perspective top view of the exemplary embodiment of the adjustable guide rail shown in FIGS. 1-12, with an elongated blade portion of the adjustable guide rail separated from a guide portion of the adjustable guide rail.

Figure 14:
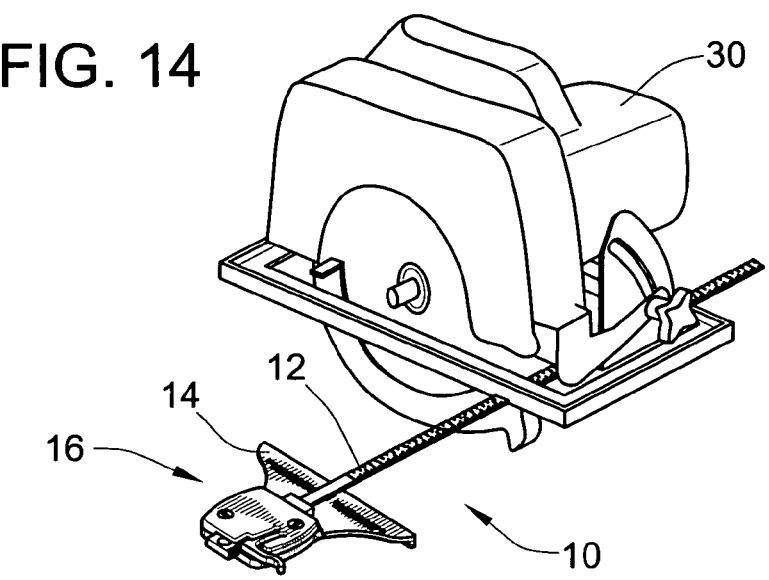

FIG. 14 is a perspective illustration of the exemplary embodiment of the adjustable guide rail of FIGS. 1-13 attached to a portable hand tool, in the form of a circular saw, according to the invention.

Figure 15:
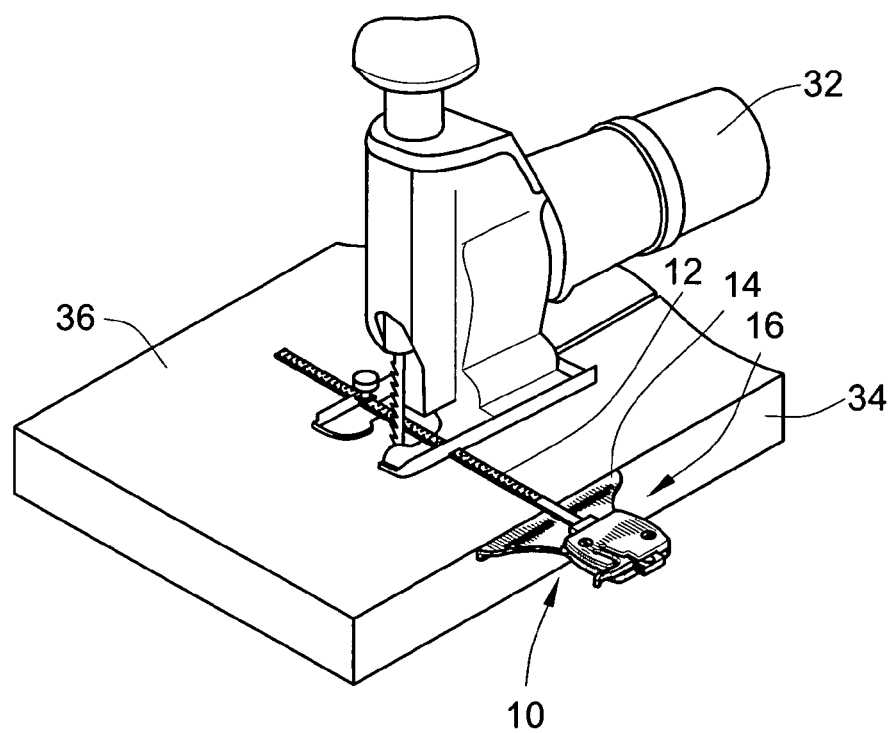

FIG. 15 is a perspective illustration of the exemplary embodiment of the adjustable guide rail of FIGS. 1-13 attached to a portable hand tool, in the form of a jigsaw, with a guide portion of the adjustable guide rail shown contacting an edge of a work piece for guiding a cutting blade of the jigsaw in relation to the edge of the work piece, according to the invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

FIG. 12 is an exploded perspective representation of the components which are assembled to form the exemplary embodiment of an adjustable guide rail 10 for circular saws and jigsaws, shown in assembled form in FIGS. 1–11, 14 and 15. As shown in FIG. 13, the adjustable guide rail 10 includes an elongated blade 12, which is attached to a guide 14 by a locking ratcheting latch apparatus 16 described in more detail below with reference to FIGS. 1–12 and 14–15. The blade 12 and guide 14 include scribed graduations to facilitate adjustment of a guide rail 10. In general, the blade 12 and guide 14 of the guide rail 10 function in a typical manner for guide rails of this type. As shown in FIGS. 14 and 15, the blade 12 is inserted into a slot in the housing of a circular saw 30 or a jigsaw 32, and locked in place. The guide 14 is then moved along the blade to place an edge guide portion 17 of the guide 14 in proper position to abut the edge 34 of a work piece 36 to be cut by the saw 30, 32.

In the exemplary embodiment of the adjustable guide rail 10, according to the invention, the blade 12 is attached to a slider 18 of the locking ratcheting latch apparatus 16 and slidingly inserted into a slot 19 in the guide 14. A cover 20 of the locking and ratcheting latch assembly 16 secures the slider 18 in the slot 19 of the guide 14.

Figure 6:
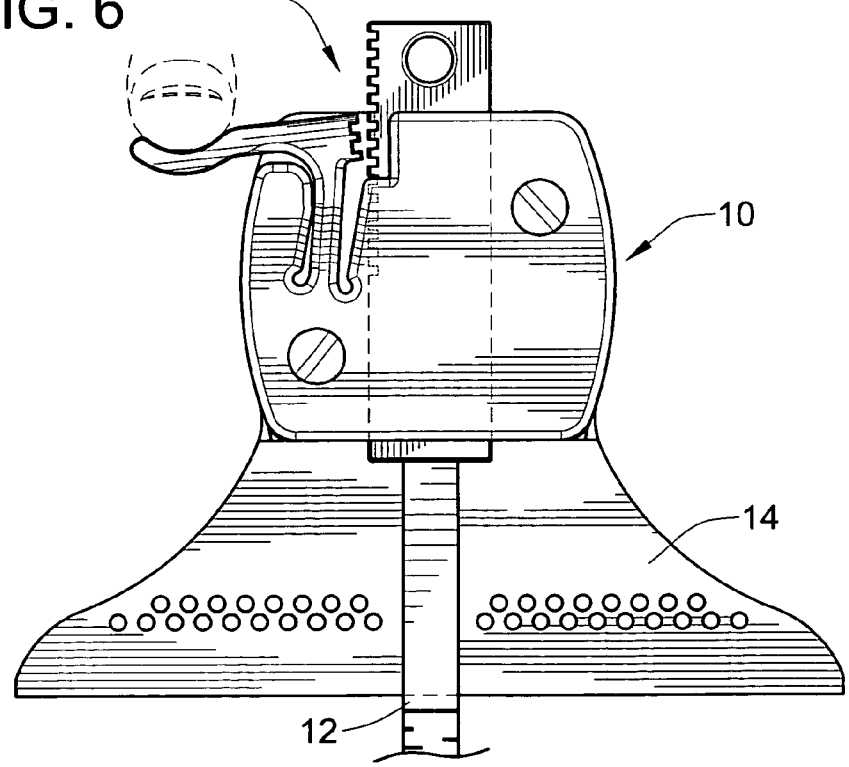

A portion of the cover 20 is configured to form a moveable thumb latch 22 having a series of teeth 24 on one face thereof, for selective engagement with a mating series of teeth 26 on the slider 18. As shown in FIG. 5, the thumb latch 22 is configured in such a manner that the teeth 24 on the thumb latch are spring loaded into engagement with the teeth 26 on the slider 18 when the thumb latch is in a normally non-depressed position. As shown in FIG. 6, when the thumb latch 22 is depressed, the teeth 24 on the thumb latch disengage from the teeth on the slider 26, thereby allowing the position of the guide 14 relative to the blade 12 and slider 18 to be adjusted.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. For example, those having skill in the art will recognize that, although the exemplary embodiments described above relate to an adjustable guide for use with circular saws or jig saws, an adjustable guide according to the invention may also be used with other types of hand tools as well, such as a router.

The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An adjustable guide rail apparatus for a hand tool, for guiding the hand tool along an edge of a workpiece or the like when attached to the hand tool, the guide rail apparatus comprising:

an elongated blade, a guide and a thumb-operable locking ratcheting apparatus;

the guide being adapted for engaging the edge of the workpiece; and the elongated blade being adapted for fixed attachment to the hand tool, and operatively attached to the guide by the locking ratcheting apparatus;

the locking ratcheting apparatus including a first series and a second series of teeth, with the first series of teeth being fixedly attached to the elongated blade, and the guide including a movable thumb-operable latch having the second series of teeth fixedly attached thereto in such a manner that the second series of teeth are selectively movable by the thumb-operable latch into and out of engagement with the first series of teeth on the elongated blade, for selectively preventing and allowing sliding movement of the elongated blade with respect to the guide;

the thumb-operable latch being spring biased by a spring, to urge the second series of teeth on the thumb-operable latch into engagement with the first series of teeth on the blade when the thumb-operable latch is in a normally non-actuated position whereat thumb-pressure is not being exerted on the latch;

the locking ratcheting apparatus having a slider and a cover operatively attached to the elongated blade and guide respectively;

the slider being fixedly attached to the elongated blade and defining the first series of teeth;

the guide and cover, in combination, defining a slot for sliding receipt therein of the slider;

the cover including a portion thereof forming the movable thumb-operable latch.

2. The adjustable guide rail apparatus of claim 1, wherein the portion of the cover forming the movable thumb-operable latch also forms the spring.

3. The adjustable guide rail apparatus of claim 1, wherein the guide includes a guide surface thereof.

4. The adjustable guide rail apparatus of claim 3, wherein the guide surface of the guide is oriented perpendicularly to the slot.

5. An adjustable guide rail apparatus for a hand tool, for guiding the hand tool along an edge of a workpiece or the like when attached to the hand tool, the guide rail apparatus comprising:

an elongated blade, a guide and a thumb-operable locking ratcheting apparatus;

the guide being adapted for engaging the edge of the workpiece; and the elongated blade being adapted for fixed attachment to the hand tool, and operatively attached to the guide by the locking ratcheting apparatus;

the thumb-operable locking ratcheting apparatus including a slider and a cover operatively attached to the elongated blade and guide respectively;

the slider being fixedly attached to the elongated blade and defining a first series of teeth;

the guide and cover, in combination, defining a slot for sliding receipt therein of the slider;

the cover including a portion thereof forming a movable thumb-operable latch having a second series of teeth which are selectively movable by the thumb-operable latch into and out of engagement with the first series of teeth on the elongated blade, for selectively preventing and allowing sliding movement of the elongated blade with respect to the guide.

6. The adjustable guide rail apparatus of claim 5, wherein the thumb-operable latch is spring loaded by a spring to urge the second series of teeth on the thumb-operable latch into engagement with the first series of teeth on the blade.

7. The adjustable guide rail apparatus of claim 6, wherein the thumb-operable latch is biased by the spring to urge the second series of teeth on the latch into engagement with the first series of teeth on the slider when the thumb-operable latch is in a normally non-actuated position whereat thumb-pressure is not being exerted on the latch.

8. The adjustable guide rail apparatus of claim 7, wherein the portion of the cover forming the movable thumb-operable latch also forms the spring.

9. The adjustable guide rail apparatus of claim 6, wherein the guide includes a guide surface thereof.

10. The adjustable guide rail apparatus of claim 9, wherein the guide surface of the guide is oriented perpendicularly to the slot.

11. A method for operating an adjustable guide rail apparatus for a hand tool, for guiding the hand tool along an edge of a workpiece or the like when attached to the hand tool, wherein:

the guide rail apparatus comprises an elongated blade, a guide and a thumb-operable locking ratcheting apparatus;

the guide being adapted for engaging the edge of the workpiece; and the elongated blade being adapted for fixed attachment to the hand tool, and operatively attached to the guide by the locking ratcheting apparatus;

the locking ratcheting apparatus including a first series and a second series of teeth, with the first series of teeth being fixedly attached to the elongated blade, and the guide including a movable thumb-operable latch having the second series of teeth fixedly attached thereto in such a manner that the second series of teeth are selectively movable by the thumb-operable latch into and out of engagement with the first series of teeth on the elongated blade, for selectively preventing and allowing sliding movement of the elongated blade with respect to the guide;

the thumb-operable latch being spring biased by a spring, to urge the second series of teeth on the thumb-operable latch into engagement with the first series of teeth on the blade when the thumb-operable latch is in normally non-actuated position whereat thumb-pressure is not being exerted on the latch;

the locking ratcheting apparatus having a slider and a cover operatively attached to the elongated blade and guide respectively;

the slider being fixedly attached to the elongated blade and defining the first series of teeth;

the guide and cover, in combination, defining a slot for sliding receipt therein of the slider;

the cover including a portion thereof forming the movable thumb-operable latch; and the method comprises, attaching the elongated blade to the hand tool and operatively attaching the guide to the elongated blade with the locking ratcheting apparatus.

12. The method of claim 11, further comprising, adjusting the relative position of the elongated blade while applying thumb-pressure to the thumb-operable locking apparatus.

13. The method of claim 12, further comprising, selectively moving the second series of teeth into and out of engagement with the first series of teeth.

14. The method of claim 12, further comprising, releasing thumb pressure on the thumb-operable latch, so that the spring is once again biasing the second series of teeth on the latch into engagement with the first series of teeth on the elongated blade.

* * * * *